(12) United States Patent
Spellman

(10) Patent No.: US 6,411,081 B1
(45) Date of Patent: Jun. 25, 2002

(54) LINEAR POSITION SENSOR USING MAGNETIC FIELDS

(75) Inventor: Charles Albert Spellman, Auburn, IN (US)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/499,523

(22) Filed: Feb. 10, 2000

(51) Int. Cl.$^7$ ................................................. G01B 7/30
(52) U.S. Cl. ............................. 324/207.21; 324/207.24
(58) Field of Search ..................... 324/207.2, 207.21, 324/207.22, 207.24, 207.26, 249, 251, 252, 207.25; 338/32 H, 32 R

(56) References Cited

U.S. PATENT DOCUMENTS

| | | | |
|---|---|---|---|
| 4,712,083 A | 12/1987 | Heck et al. | 338/32 R |
| 5,216,363 A | 6/1993 | Masaaki | 324/207.21 |
| 5,399,967 A * | 3/1995 | Carscadden | 324/207.2 |
| 5,430,374 A | 7/1995 | Metz | 324/207.21 |
| 5,430,375 A | 7/1995 | Inoue et al. | 324/207.21 |
| 5,570,015 A | 10/1996 | Takaishi et al. | 324/207.21 |
| 5,574,365 A | 11/1996 | Oyama et al. | 324/207.24 |
| 5,606,256 A | 2/1997 | Takei | 324/207.21 |

OTHER PUBLICATIONS

Descrete Semiconductors—KMZ41 Magnetic field sensor (Data Sheet) Mar. 26, 1998.
Discrete Semiconductors—UZZ9000 Sensor Conditioning Electronics (Data Sheet) May 18, 1998.

\* cited by examiner

*Primary Examiner*—Jay Patidar

(57) ABSTRACT

A linear position sensing system is disclosed. The system mounts a pair of magnets on an object which traverses a linear path. The position of the object is determined by a sensor unit which has a magnetic field transducer. The magnetic field transducer detects the field angle from the magnetic field generated between the magnets. The magnetic field transducer is preferably a Wheatstone bridge arrangement with magneto-resistive elements. The output signal of the transducer is a sinusoidal shape representing the angle of the magnetic fields generated by the magnets to the transducer. The transducer signal is sent to a signal processor. The signal processor calculates the position of the magnets and thus the object by determining the arctangent value of the sinusoidal signals. The magnets also are placed at a predetermined angle to one another in order to optimize the linear response of the sensor.

16 Claims, 4 Drawing Sheets

LINEAR POSITION SENSOR USING MAGNETIC FIELDS

FIELD OF INVENTION

This invention relates to a magento-resistive linear position sensor. More specifically, this invention relates to a linear position sensor which uses magneto-resistive elements to sense the direction of the magnetic field as a sinusoid signal which is indicative of object position.

BACKGROUND

It is desirable in many applications to determine the precise position of various objects which linearly traverse a defined path. For example in the case of an exhaust gas reciprocating (EGR) valve which is used to control the amount of exhaust gas which is recirculated into a cylinder, it is highly desirable to accurately determine the position of the valve in order to precisely control the amount of gas which is allowed back into the cylinder. An accurate measurement of the valve position allows the optimal amount of gas to be recirculated thus increasing engine performance but avoiding an overabundance of exhaust gas which may prevent the cylinder from firing.

Linear position sensing is presently performed using a variety of electrically based sensor devices. Present linear position sensors include linear voltage differential transducers (LDVT), variable inductance, variable capacitance and eddy current killed oscillators. LDVT and variable inductance sensors determine linear position by means of a rod inserted in a coil or coils of wire. The rod's position is determined by measuring the amount of inductance or current through the coil or coils. As the rod is inserted into the coil or coils, the inductance measured changes. The position of the rod is thus roughly proportional to the amount of measured inductance or current. Calculations may be made to convert the measured inductance or current to a linear position representation. However, these solutions create problems with regard to cost, measurement resolution, accuracy and packaging. While these systems can be made to function, they tend to be expensive and often lead to packaging issues in their application. For example, in the case of an LVDT, two coils are required thus doubling the size of the sensor package and increasing the cost of the sensor.

In contrast, eddy current and capacitance based position sensors measure frequency. The frequency of the signal depends on the position of the target. A common method for sensing linear position involves using a magnet connected to a displaceable member such as a rod or piston and measuring the magnetic field from the magnet. The magnetic field measurement is roughly proportional to the distance from the magnet. Thus, the position may be determined through a series of calculations for the measured magnetic field.

Such present methods suffer from several problems. Most significantly, the magnetic field strength, inductance strength and current strength are not exactly linear which introduces error in the position measurement. This inaccuracy increases as the magnetic field, or inductance or current reach further distances away from the transducers for measurement of the fields.

Additional solutions have included using a linear magneto-resistive transducer in conjunction with a moving magnet. The magnetic field sensed by the transducers is an indication of the position of the magnet. However, the non-linear nature of the magnetic field results in distortions near the ends of the traversal of the magnet. Such distortions may be corrected, but such corrections require extra circuitry or processing which increase the complexity and cost of the device.

Thus, there exists a need for a linear magnetic position sensor. There is also a further need for a position sensor which uses magneto-resistive elements with simple circuitry. There is also a need for a linear position sensor which provides a more accurate linear positioning signal than present positioning sensors.

SUMMARY OF THE INVENTION

The present invention is embodied in a linear position sensor for determining the position of a moveable object having two magnets generating a magnetic field. The two magnets are spaced apart in a perpendicular plane to the plane of traverse of the object. The sensor has a first magnetic field transducer which detects the generated magnetic field and outputs a first sinusoidal signal representative of the magnetic field direction. A second magnetic field transducer detects the generated magnetic field and outputs a second sinusoidal signal representative of the magnetic field direction. A signal processor unit is coupled to the first and second magnetic field transducers. The signal processor unit outputs a signal which is a function of the sinusoidal signals representative of the position of the object relative to the first and second transducers. The magnets are placed in an angular relation to each other in order to optimize the linear relation between the sinusoidal signals and the actual position of the object.

The invention is also embodied in a method of determining the position of an object. Two magnets are fixed on an object. The two magnets are set at a predetermined angle to provide an optimal linear response based on the sinusoidal variation of the magnetic field produced by the magnets. The magnetic field direction produced by the magnets is detected. The detected magnetic field direction is converted into sinusoidal signals. The position is then determined based on the sinusoidal signals.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
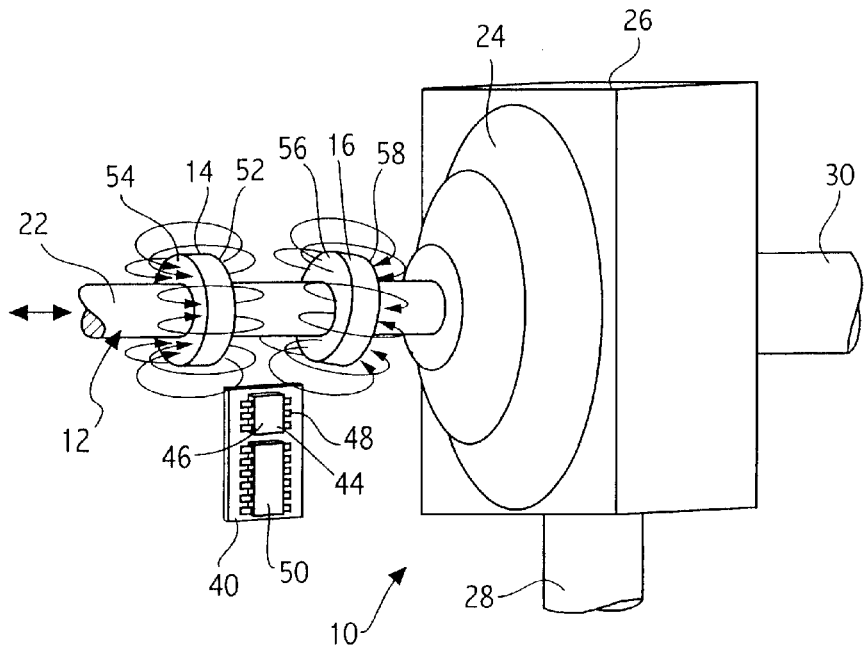
FIG. 1 is a perspective view of a valve with a linear magnetic field position sensor according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
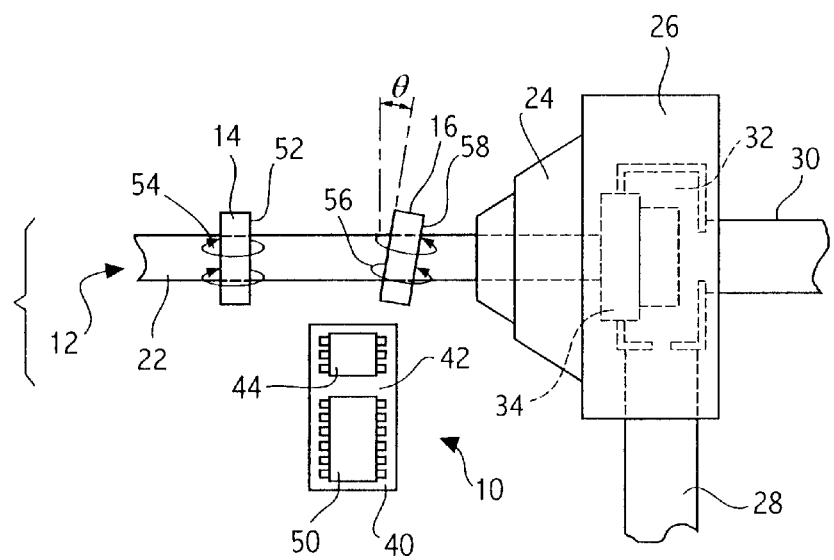
FIG. 2 is a side view of the valve and the linear magnetic field position sensor according to the present invention.

Referring now to the drawings and more particularly to FIGS. 1–2 which show a perspective view and a side view of a linear positioning sensor generally indicated at 10, embodying the general principles of the present invention.

In general, the linear positioning sensor 10 senses the position of an object such as an exhaust gas reciprocating (EGR) valve 12 which moves in a linear motion relative to the linear positioning sensor 10. The object which is sensed by the sensor 10 is typically moved or mounted on a fixed track or path to insure strict linear movement. The EGR valve 12 has a pair of magnets 14 and 16 which are spaced apart in a perpendicular plane to the plane of traverse of the EGR valve 12.

The position of the object is detected by a sensor unit 40. The sensor unit 40 is mounted in a non-ferrous package to minimize magnetic interference. In this example, the object is an EGR valve 12 but as may be understood, the principles of the sensor 10 may be applied to any linear positioning application.

The EGR valve 12 has a stem 22 which has one end attached to a driver mechanism (not shown). The driver mechanism may be an electric motor or a vacuum drive or any other appropriate device. The stem 22 may thus be driven back and forth in a linear path. The magnets 14 and 16 are mounted concentrically around the stem 22 and are spaced apart to generate a magnetic field as will be explained below.

The opposite end of the stem 22 is attached to a diaphragm 24. The diaphragm 24 is in contact with a valve body 26. The valve body 26 has an input port 28 which is connected to an exhaust gas source (not shown). The valve body 26 also has an output port 30 which is connected to an engine cylinder (not shown). Exhaust gas from the input port 28 is forced through a chamber 32 and out the output port 30 to the engine cylinder. The amount of gas which may be forced through the chamber 32 depends on the position of a valve 34 connected to the diaphragm 24. By moving the stem 22 and thus the diaphragm 24, more or less exhaust gas may be sent to the engine cylinder. The amount of gas which is sent to the engine cylinder is a function of the position of the EGR valve 12.

The sensor unit 40 has processing and sensing electronics which are mounted on a printed circuit board 42. The printed circuit board 42 has a magnetic sensing element which is a transducer chip 44. The transducer chip 44 has a pair of magnetic field transducers such as magneto-resistive elements 46 and 48 which detect the direction of the magnetic field generated by magnets 14 and 16.

In the preferred embodiment, the transducer chip 44 is a KMZ41 magnetic field sensor manufactured by Philips Electronics. The transducer chip 44 outputs an electronic signal responsive to the detected magnetic field direction from the magnets 14 and 16. However any appropriate magnetic field sensor may be used. As will be explained below, the transducer chip 44 outputs a varying sinusoidal signal from the magnetic field transducers such as magneto-resistive elements 46 and 48 which are representative of the angle direction of the detected magnetic field from the magnets 14 and 16.

The outputs of the transducer chip 44 are coupled to a signal processor unit 50. The signal processor unit 50 reads the sinusoidal signals output from the transducer chip 44 and converts them into a digital linear output. The signal processor unit 50 in the preferred embodiment is a UZZ9000 sensor conditioning electronic unit manufactured by Philips Electronics. However any appropriate hardware or software configuration may be used to process the raw signals from the transducer chip 44 to output a linear signal.

The magnets 14 and 16 are spaced apart to create an air gap. The sensor unit 50 is located in relation the EGR valve 12 such that the transducer chip 44 senses the magnetic field from both of the magnets 14 and 16 over the traversal path of the EGR valve 12.

The magnets 14 and 16 are typically rare earth magnets which are preferably made of SmCo material although any suitable magnetic materials may be used. Alternatively electromagnets may be used when stronger magnetic fields are desired. The magnet 14 has a north pole 52 and south pole 54 while the magnet 16 has a north pole 56 and a south pole 58. The north pole 52 of the magnet 14 faces the north pole 56 of the magnet 16. This creates a magnetic field between the magnets 14 and 16 as shown by the flux lines in FIGS. 1 and 2.

Figure 3A:
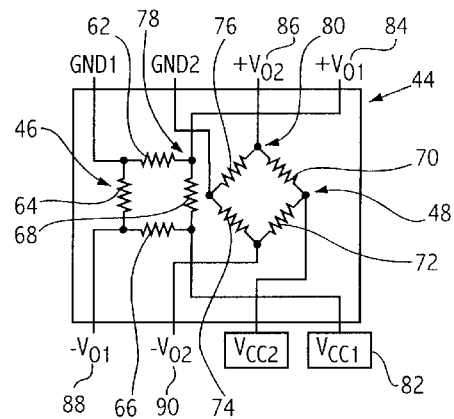
FIGS. 3A & 3B are circuit diagrams of the sensor circuitry of the present invention.

FIG. 3A is a circuit diagram of the transducer unit 44 which is KMZ41 Philips magnetic field sensor. The transducer unit 44 is an integrated circuit package, but any other appropriate packaging may be used. Each sensing element 46 and 48 has a series of four magneto-resistive elements 62, 64, 66 and 68 and 70, 72, 74 and 76 respectively, arranged in two Wheatstone bridge circuits 78 and 80. The magneto-resistive elements 62–76 are preferably thin film Permalloy. The Wheatstone bridge circuits 78 and 80 are separated galvanically.

The Wheatstone bridge circuits 78 and 80 are coupled to a power source 82 and a ground lead. The Wheatstone bridge circuits 78 and 80 have a positive output 84 and 86 respectively and a negative output 88 and 90 respectively. The positive outputs 84 and 86 are coupled to the processing circuit 80. The Wheatstone bridge circuit 78 outputs the sinusoidal signal representing the sine of the magnetic field direction sensed from the magnets 14 and 16. The Wheatstone bridge circuit 80 is oriented at a 45 degree angle to the Wheatstone bridge circuit 78 and thus outputs a sinusoidal signal representing the cosine of the magnetic field direction sensed from the magnets 14 and 16.

Figure 4:
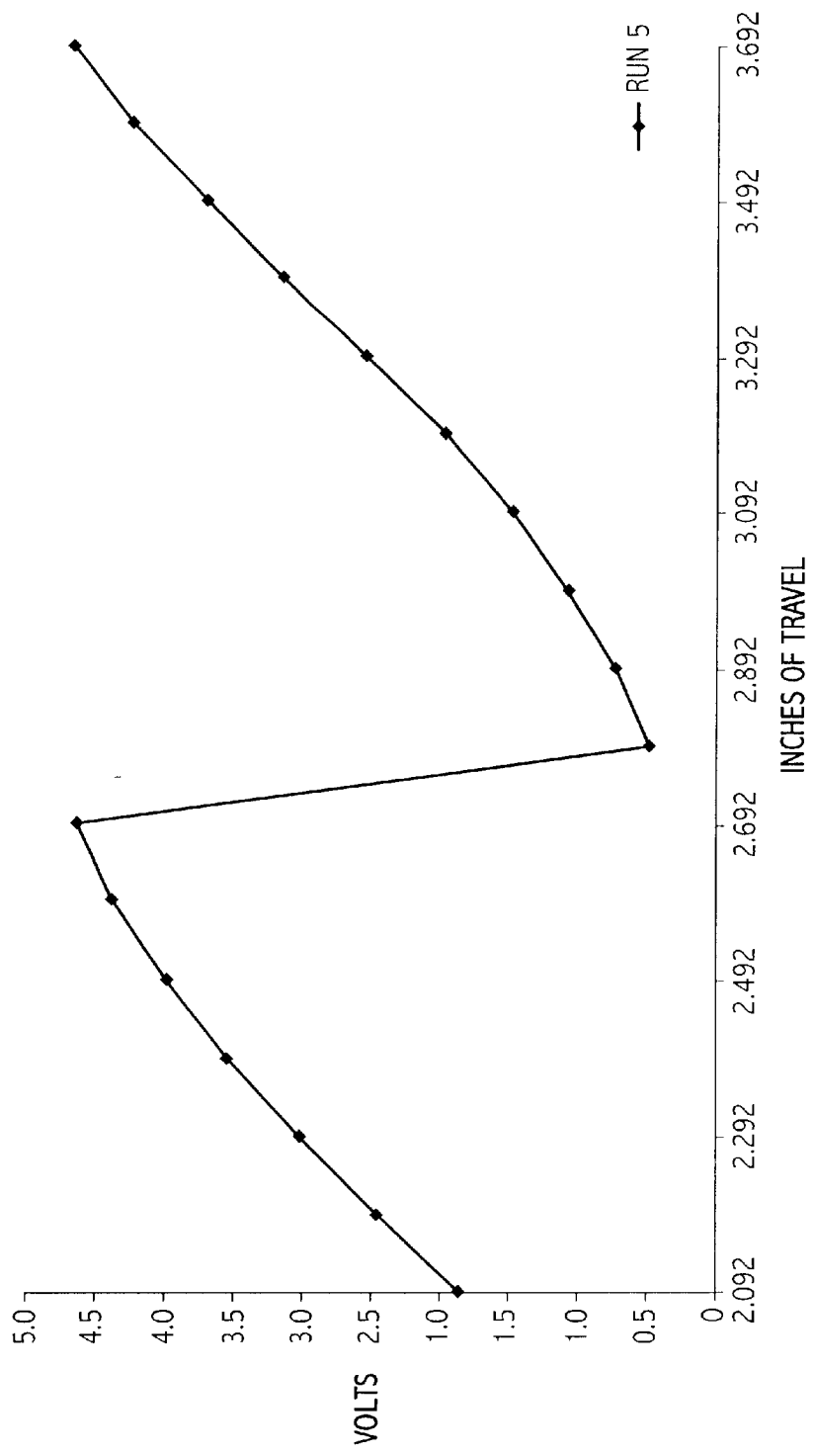
FIG. 4 is a graph of the arctangent of the field directions generated by the magnets of the present invention in relation to the position of the object.

The Wheatstone bridge circuits 78 and 80 are arranged in order to determine the angle of the magnetic field relative to the circuits 78 and 80. The angle degree of the detected magnetic field is approximately sinusoidally in proportion to the location of the magnets 14 and 16 in relation to the transducer unit 44. As the magnets 14 and 16 move, the arctangent of the magnetic field angle degree changes in an approximately linear fashion. This may be shown in FIG. 4 which is a plot of the position of the EGR valve 12 and the voltage output of the transducer unit 44 which represents the arctangent of the field angle degree.

Figure 3B:
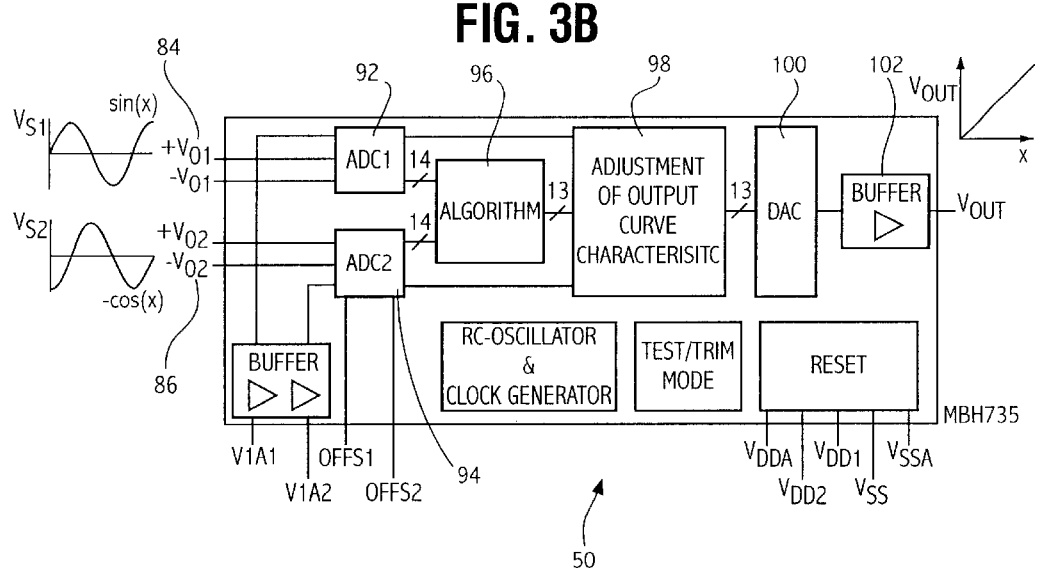

FIG. 3B is a circuit diagram of the processing circuit unit 50. The positive output signal 84 of the Wheatstone bridge circuit 78 is coupled to an analog to digital converter circuit 92. Similarly, the positive output signal 86 of the Wheatstone bridge circuit 80 is coupled to an analog to digital converter circuit 94. The digital output of the analog to digital converter circuits 92 and 94 are coupled to a signal processor block 96. The signal processor block 96 converts the signals into a digital signal using a CORDIC algorithm. The CORDIC algorithm converts the sine and cosine values received from the sinusoidal signals into an arctangent value. However, any suitable conversion algorithm may be used instead.

The output of the signal processor block 96 is coupled to an output curve characteristic processor 98. The output curve characteristic processor 98 shapes the signal to output the desired span and offset angle. The output of the output curve characteristic processor 98 is coupled to a digital to analog converter 100 which outputs a signal which is buffered by a buffer circuit 102.

As noted above, the signal processor 50 calculates the arctangent of the angle based on the sine and cosine of the magnetic field direction determined from the sensing elements 46 and 48 which measure the magnetic field between the magnets 14 and 16.

The arctangent of the angle produces a linear output which represents the angle of the field and thus the linear position of the object 12. The magnets 14 and 16 are oriented such that a change in position will change the angle of the magnetic field sinusoidally and thus the sinusoidal field signal sensed by the sensing elements 46 and 48.

Figure 5:
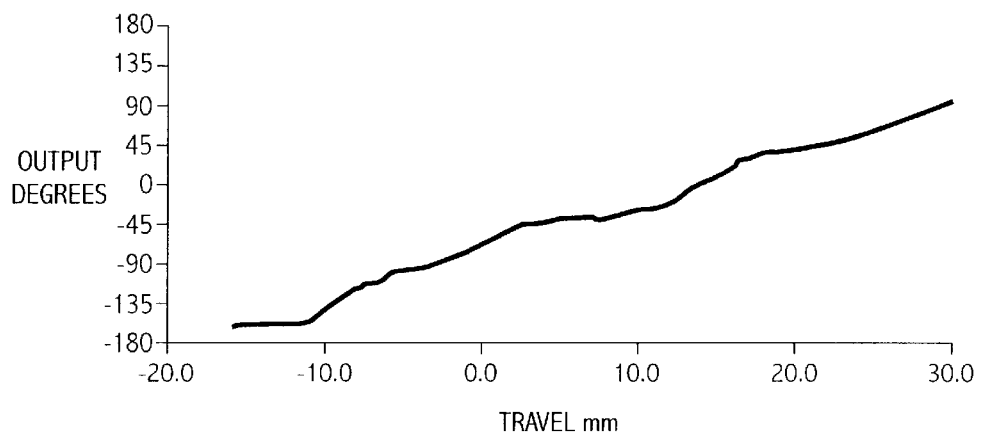
FIG. 5 is a graph of the position output of the sensor according to the present invention.

The orientation of the magnets 14 and 16 provides sinusoidal signals which linearly approximate, through the arctangent value, the position of the magnets 14 and 16 and thus the object 12. FIG. 5 is a graph of the output of the signal processor 50 in relation to the position of the object such as the EGR valve 12. The output curve in FIG. 5 is a rough approximation of the angle of the magnetic field detected (−180 to 180 degrees) and the position of the object. The output curve in FIG. 5 is a result of the magnets 14 and 16 being fixed in parallel to each other. As may be seen in FIG. 5, the output is approximately linear, however there are several flat spots in the curve which result in positional inaccuracies.

Figure 6:
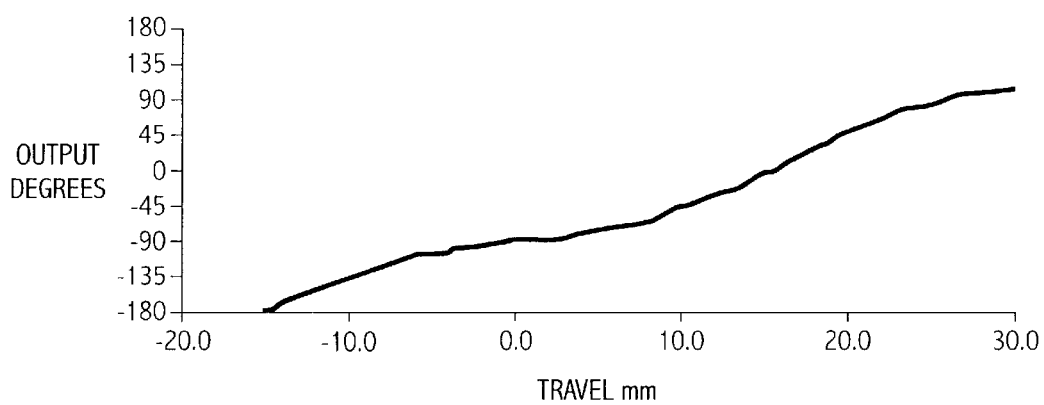
FIG. 6 is a graph of the position output of the sensor with the placement of the magnets optimized for linear response according to the present invention.

In order to obtain the best linear approximation, it is desirable to adjust the angle of one of the magnets 14 or 16 relative to the other magnet as seen in FIGS. 1 and 2. By adjusting the magnet 16, for example, to an angle of approximately 10 degrees, a more linear curve is obtained. FIG. 6 is a graph of the arctangent output voltage in degrees in relation to the position of the EGR valve 12. As may be seen, the curve is more linear and thus more accurate of position. The angle of the magnet 16 is adjusted to optimize the linear response of the sensor 10. This may be performed to determine the optimal angle and to fix the magnets at this angle for sensor manufacture.

Of course, the present invention may be employed in any application which requires determination of linear position. Examples in the automotive field include shock absorbers, seat position, idle air control valves, brake pedal position, steering rack position, valve lift, injection portals, brake pad wear indicator, headlight position, window position, and air dam position.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A linear position sensor for determining the position of a moveable object having two magnets generating a magnetic field, the two magnets spaced apart in a perpendicular plane to the plane of traverse of the object, the sensor comprising:

a first magnetic field transducer which detects the generated magnetic field and outputs a first sinusoidal signal representative of the angle of the magnetic field direction relative to the first transducer;

a second magnetic field transducer which detects the generated magnetic field and outputs a second sinusoidal signal representative of the angle of the magnetic field direction relative to the second transducer;

a signal processor unit coupled to the first and second magnetic field transducers, the signal processor unit outputting a signal which is a function of the sinusoidal signals representative of the position of the object relative to the first and second transducers; and wherein the magnets are placed in an angular relation to each other in order to optimize the linear relation between the sinusoidal signals and the actual position of the object.

2. The linear position sensor of claim 1 wherein the first and second magnetic field transducers each further include a Wheatstone bridge having four magnetic transducer elements.

3. The linear position sensor of claim 2 wherein the magnetic transducer elements are magneto-resistive elements.

4. The linear position sensor of claim 1 wherein the sinusoidal signal of the first transducer is the sine of the angle of direction of the magnetic field and the sinusoidal signal of the second transducer is the cosine of the angle of the direction of the magnetic field.

5. The linear position sensor of claim 4 wherein the signal processor unit includes a module to calculate the arctangent value of the sinusoidal signals.

6. The linear position sensor of claim 1 wherein the magnets have identical poles which are spaced apart from each other and facing each other, and wherein the magnetic transducer elements detect the magnetic field between the identical poles.

7. A method of determining the position of an object, comprising:

fixing two magnets on an object, the two magnets set at a predetermined angle to each other to provide an optimal linear response based on the sinusoidal variation of the magnetic field produced by the magnets;

detecting the angle of the magnetic field direction produced by the magnets relative to a fixed point;

converting the magnetic field direction into sinusoidal signals; and determining the position based on the sinusoidal signals.

8. The method of claim 7 wherein the first and second magnetic field transducers each further include a Wheatstone bridge having four magnetic transducer elements.

9. The method of claim 7 wherein the magnetic transducer elements are magneto-resistive elements.

10. The method of claim 7 wherein the step of detecting the direction of the magnetic field includes measuring the sine of the angle of direction of the magnetic field and measuring the cosine of the angle of the direction of the magnetic field.

11. The method of claim 10 further including the step of calculating the arctangent value of the sinusoidal signals and outputting the arctangent value as a representation of the linear position of the object.

12. The method of claim 7 wherein the magnets have identical poles which are spaced apart from each other and facing each other and the magnetic field is generated between the identical poles.

13. A linear position sensor for determining the position of a moveable object having two magnets generating a magnetic field, the two magnets spaced apart in a perpendicular plane to the plane of traverse of the object, the sensor comprising:

a first magnetic field transducer, including a first Wheatstone bridge having four magnetic transducer elements, which detects the generated magnetic field and outputs a first sinusoidal signal representative of the magnetic field direction;

a second magnetic field transducer, including a second Wheatstone bridge having four magnetic transducer elements, which detects the generated magnetic field and outputs a second sinusoidal signal representative of the magnetic field direction;

a signal processor unit coupled to the first and second magnetic field transducers, the signal processor unit outputting a signal which is a function of the sinusoidal signals representative of the position of the object relative to the first and second transducers; and wherein the magnets are placed in an angular relation to each other in order to optimize the linear relation between the sinusoidal signals and the actual position of the object.

14. The linear position sensor of claim 13 wherein the magnetic transducer elements are magneto-resistive elements.

15. The linear position sensor of claim 13 wherein the sinusoidal signal of the first transducer is the sine of the angle of direction of the magnetic field and the sinusoidal signal of the second transducer is the cosine of the angle of the direction of the magnetic field.

16. The linear position sensor of claim 15 wherein the signal processor unit includes a module to calculate the arctangent value of the sinusoidal signals.

* * * * *